(12) United States Patent
Chen et al.

(10) Patent No.: US 10,817,044 B2
(45) Date of Patent: Oct. 27, 2020

(54) POWER SAVING CONTROL APPARATUS AND POWER SAVING CONTROL METHOD APPLIED TO DISPLAY DRIVING CIRCUIT

(71) Applicant: Raydium Semiconductor Corporation, Hsinchu (TW)

(72) Inventors: Chien-Hao Chen, Hsinchu (TW); Chih-Hao Wu, Zhubei (TW); Chih-Chuan Huang, Zhubei (TW); Sung-Bo Chen, Zhubei (TW)

(73) Assignee: Raydium Semiconductor Corporation, Hsinchu (TW)

( * ) Notice: Subject to any disclaimer, the term of this patent is extended or adjusted under 35 U.S.C. 154(b) by 1 day.

(21) Appl. No.: 16/360,178

(22) Filed: Mar. 21, 2019

(65) Prior Publication Data
US 2019/0302873 A1 Oct. 3, 2019

Related U.S. Application Data

(60) Provisional application No. 62/648,980, filed on Mar. 28, 2018.

(51) Int. Cl.
*G06F 1/3234* (2019.01)
*G09G 3/20* (2006.01)

(52) U.S. Cl.
CPC ............. *G06F 1/3265* (2013.01); *G09G 3/20* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2011/0061947 | A1* | 3/2011 | Krah | G06F 3/041 178/18.01 |
| 2012/0038614 | A1* | 2/2012 | Mizumaki | G09G 3/3614 345/211 |
| 2014/0091998 | A1* | 4/2014 | Ko | G09G 3/3674 345/100 |
| 2016/0171942 | A1* | 6/2016 | Chang | G09G 3/3648 345/87 |

* cited by examiner

*Primary Examiner* — Amare Mengistu
*Assistant Examiner* — Sarvesh J Nadkarni

(57) ABSTRACT

A power saving control apparatus applied to a display driving circuit is disclosed. The power saving control apparatus includes a data analysis unit, a bias control unit and a charge sharing unit. The bias control unit is used to perform bias control. The charge sharing unit is used for charge sharing. The data analysis unit is coupled to the bias control unit and the charge sharing unit respectively. The data analysis unit instantly analyzes the display data to generate an instant analysis result and dynamically adjust the setting of bias and slew rate of the bias control unit according to the instant analysis result. The data analysis unit can dynamically adjust the setting of charge sharing range and charge sharing group number needed to be performed by the charge sharing unit according to the instant analysis result.

10 Claims, 6 Drawing Sheets

POWER SAVING CONTROL APPARATUS AND POWER SAVING CONTROL METHOD APPLIED TO DISPLAY DRIVING CIRCUIT

BACKGROUND OF THE INVENTION

1. Field of the Invention

The invention relates to a display; in particular, to a power saving control apparatus and a power saving control method applied to a display driving circuit.

2. Description of the Prior Art

In general, the conventional bias control method often uses a bias control circuit with a fixed slew rate and a bias voltage regardless of the actual output voltage variation, resulting in unnecessary power waste.

For example, as shown in the output voltage characteristic diagram of FIG. 1, if the output voltage of the higher voltage level V1 is to be satisfied for the required time TD, the slope will be G1; once the output voltage becomes lower voltage level V2, since the bias voltage is fixed, the slope G2 will be equal to G1, and the actual time required should be less than the time TD. However, in the case where the slew rate is also fixed, the time TD will be also fixed, thereby causing unnecessary power waste.

In order to improve the above shortcomings, the current method needs to first compare the data stored in the previous data latch PLA and the display data latch DLA through the comparator COM in the timing controller TCON and then dynamically adjust the bias voltage and slew rate of the bias control unit BCU1~BCUN in each source driver SD1~SDN according to the comparison result; that is to say, the source drive still cannot independently improve this unnecessary power waste.

SUMMARY OF THE INVENTION

Therefore, the invention provides a power saving control apparatus and a power saving control method applied to a display driving circuit to solve the above-mentioned problems of the prior arts.

A preferred embodiment of the invention is a power saving control apparatus. In this embodiment, the power saving control apparatus is applied to a display driving circuit. The power saving control apparatus includes a data analysis unit, a bias control unit and a charge sharing unit. The bias control unit is used to perform bias control. The charge sharing unit is used for charge sharing. The data analysis unit is coupled to the bias control unit and the charge sharing unit respectively. The data analysis unit instantly analyzes the display data to generate an instant analysis result and dynamically adjust the setting of bias and slew rate of the bias control unit according to the instant analysis result. The data analysis unit can dynamically adjust the setting of charge sharing range and charge sharing group number needed to be performed by the charge sharing unit according to the instant analysis result.

In an embodiment, the display driving circuit is a source driver and coupled to a timing controller.

In an embodiment, the display driving circuit is a source driver with an embedded timing controller.

In an embodiment, a plurality of channels of the display driving circuit selects the same setting of bias and slew rate.

In an embodiment, a plurality of channels of the display driving circuit selects different settings of bias and slew rate.

In an embodiment, a plurality of channels of the display driving circuit selects the same equalizer to perform charge sharing.

In an embodiment, a plurality of channels of the display driving circuit selects different equalizers to perform charge sharing.

In an embodiment, the data analysis unit includes a line data analyzer for analyzing the display data on a line to obtain a characteristic value.

In an embodiment, the data analysis unit further includes a first calculator coupled to the line data analyzer and used for calculating the setting of bias voltage and slew rate necessary for the bias control unit according to the characteristic value.

In an embodiment, the data analysis unit further includes a second calculator coupled to the data analyzer and the first calculator for performing characteristic value operations between lines to obtain an instant analysis result.

Another preferred embodiment of the invention is a power saving control method.

In this embodiment, the power saving control method is applied to a power saving apparatus of a display driving circuit. The power saving control method includes steps of:

(a) instantly analyzing a display data to generate an instant analysis result;

(b) dynamically adjusting a setting of bias and slew rate according to the instant analysis result; and (c) dynamically adjusting a charge sharing range and a charge sharing group number needed to be performed according to the instant analysis result.

Compared to the prior art, the power saving control apparatus and the power saving control method applied to the display driving circuit can achieve the following advantages and effects:

(1) since the data analysis unit can analyze the display data in real time, the amount of data storage can be greatly reduced and the use of the line latch can be saved to achieve the effects of self-detection and immediate response;

(2) according to the analysis result of the data analysis unit, not only the bias voltage and slew rate of the bias control unit can be dynamically adjusted, so that different channels can independently select different settings of bias voltage and slew rate, but also the charge sharing range and charge sharing group number needed to be performed by the charge sharing unit can be further dynamically adjusted to achieve the optimal power saving effect; and (3) since the timing controller is not used for display data comparison in the power saving control apparatus and the power saving control method of the invention, the power saving control apparatus and the power saving control method of the invention can be applied to the source driver and the timing controller (TCON) embedded source driver (TED).

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

According to one embodiment of the invention, a power saving control apparatus is provided. In this embodiment, the power saving control apparatus is applied to the display driving circuit, and the display driving circuit can be a source driver and the source driver is coupled to the timing controller, or the display driving circuit is a source driver with an embedded timing controller, but not limited to this.

Figure 1:
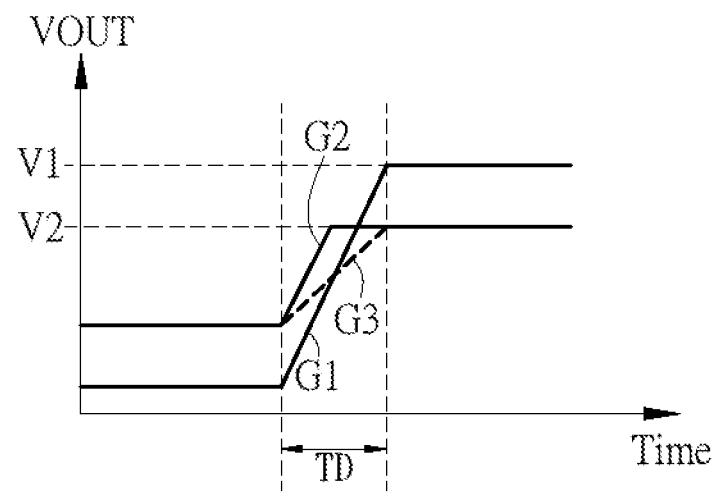
FIG. 1 is a schematic diagram showing conventional output voltage characteristics.
Figure 2:
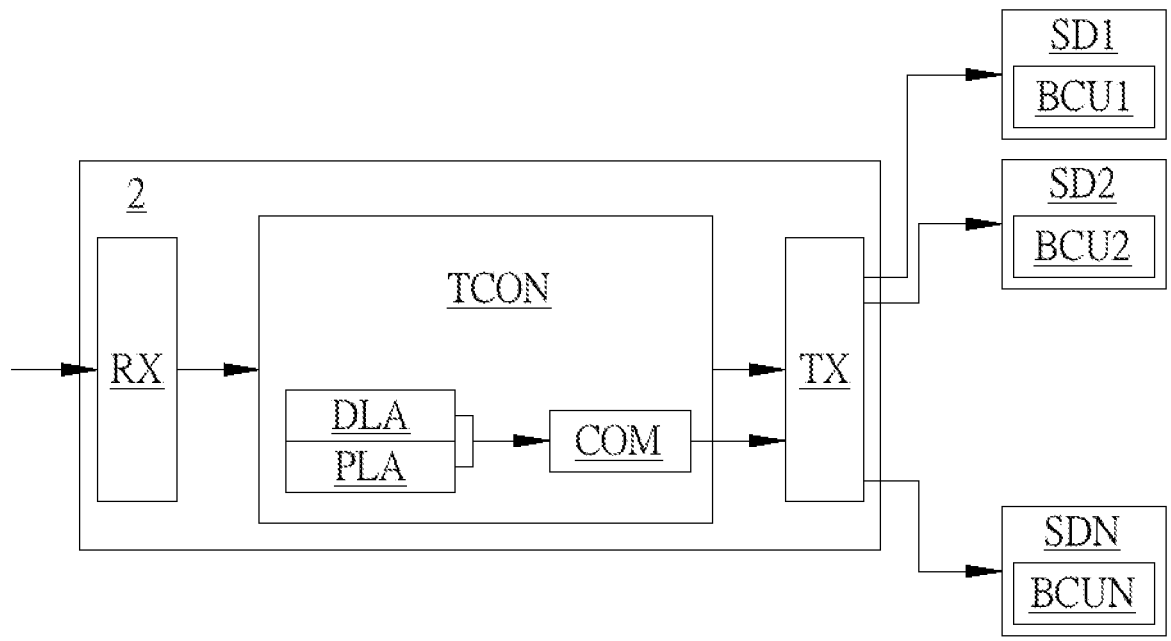
FIG. 2 is a schematic diagram showing the conventional use of a timing controller for data comparison and then dynamically adjusting the bias voltage and slew rate of the bias control unit in each source driver according to the comparison result.
Figure 3A:
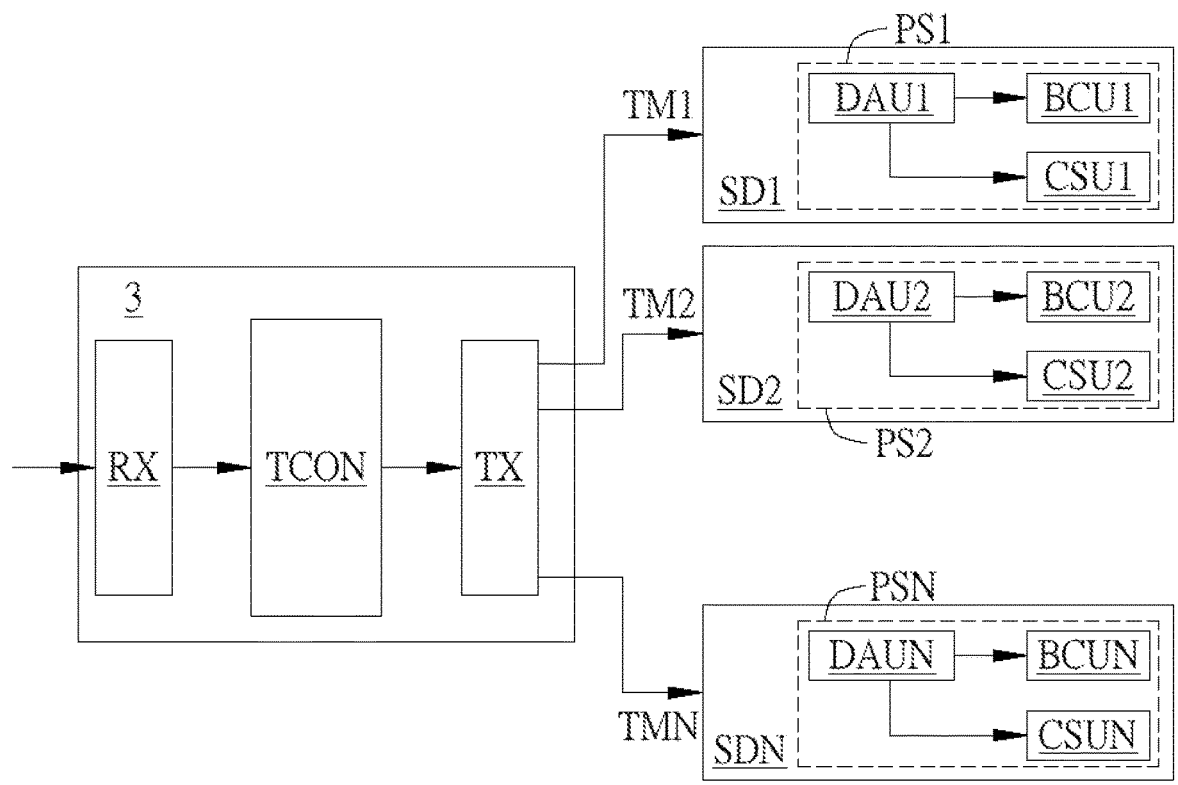
FIG. 3A is a schematic diagram of the power saving control apparatus applied to a source driver according to a preferred embodiment of the invention.

Please refer to FIG. 3A. FIG. 3A is a schematic diagram of the power saving control apparatus applied to a source driver in this embodiment.

As shown in FIG. 3A, the timing controller 3 is coupled to N source drivers SD1~SDN respectively, where N is a positive integer. The timing controller 3 includes a receiving unit RX, a timing control unit TCON, and a transmitting unit TX. The receiving unit RX is coupled to the timing control unit TCON. The timing control unit TCON is coupled to the transmitting unit TX. The transmitting unit TX is coupled to the source drivers SD1~SDN respectively and provides timing control signals TM1~TMN to the source drivers SD1~SDN respectively.

If the source driver SD1 is taken as an example, the power saving control apparatus PS1 applied to the source driver SD1 can include a data analyzing unit DAU1, a bias control unit BCU1 and a charge sharing unit CSU1. The data analysis unit DAU1 is coupled to the bias control unit BCU1 and the charge sharing unit CSU1 respectively.

In this embodiment, the bias control unit BCU1 is used for bias control; the charge sharing unit CSU1 is used for perform charge sharing; and the data analysis unit DAU1 is used for analyzing a display data in real time and generating an instant analysis result.

It should be noted that the power saving control apparatus PS1 uses the data analysis unit DAU1 to analyze the display data in real time, which can greatly reduce the data storage amount and save the use of line latch and achieve the effects of self-detection and immediate response.

After the data analysis unit DAU1 generates the instant analysis result, the data analysis unit DAU1 also determines whether the bias voltage and the slew rate need to be changed according to the instant analysis result. If the determination result is yes, the data analysis unit DAU1 will dynamically adjust the setting of bias voltage and slew rate of the bias control unit BCU1, thereby effectively improving the power wastage caused by the bias control circuit with fixed bias voltage and slew rate in prior art.

In practical applications, the plurality of channels of the source driver SD1 can select the same setting of bias and slew rate, or the plurality of channels of the source driver SD1 can independently select different settings of bias and slew rate. There are no specific restrictions.

In addition, after the data analysis unit DAU1 generates the instant analysis result, the data analysis unit DAU1 will also determine whether the charge sharing range and the charge sharing group number should be changed according to the instant analysis result. If the determination result is yes, the data analysis unit DAU1 will dynamically adjust the charge sharing range and the charge sharing group number of the charge sharing unit CSU1 to perform charge sharing, so as to achieve the optimal power saving effect.

In practical applications, the plurality of channels of the source driver SD1 can select the same equalizer for charge sharing, or the plurality of channels of the source driver SD1 can respectively select different equalizers for charge sharing, to achieve optimal power saving effect.

Similarly, if the source driver SD2 is taken as an example, the power saving control apparatus PS2 applied to the source driver SD2 can include a data analysis unit DAU2, a bias control unit BCU2 and a charge sharing unit CSU2. The data analysis unit DAU2 is coupled to the bias control unit BCU2 and the charge sharing unit CSU2 respectively.

When the data analysis unit DAU2 analyzes the display data and generates the instant analysis result, the data analysis unit DAU2 will also determine whether the bias voltage and the slew rate should be changed according to the instant analysis result. If the determination result is yes, the data analysis unit DAU2 will dynamically adjust the setting of bias voltage and slew rate of the bias control unit BCU2, thereby effectively improving the power wastage caused by the bias control circuit with fixed bias voltage and slew rate in prior art.

In addition, after the data analysis unit DAU2 generates the instant analysis result, the data analysis unit DAU2 will also determine whether the charge sharing range and the charge sharing group number should be changed according to the instant analysis result. If the determination result is yes, the data analysis unit DAU2 will dynamically adjust the charge sharing range and the charge sharing group number of the charge sharing unit CSU2 to perform charge sharing to achieve the optimal power saving effect.

The operation of the power saving control apparatus PS3~PSN applied to the source drivers SD3~SDN can also be deduced by analogy, and will not be further described herein.

Figure 3B:
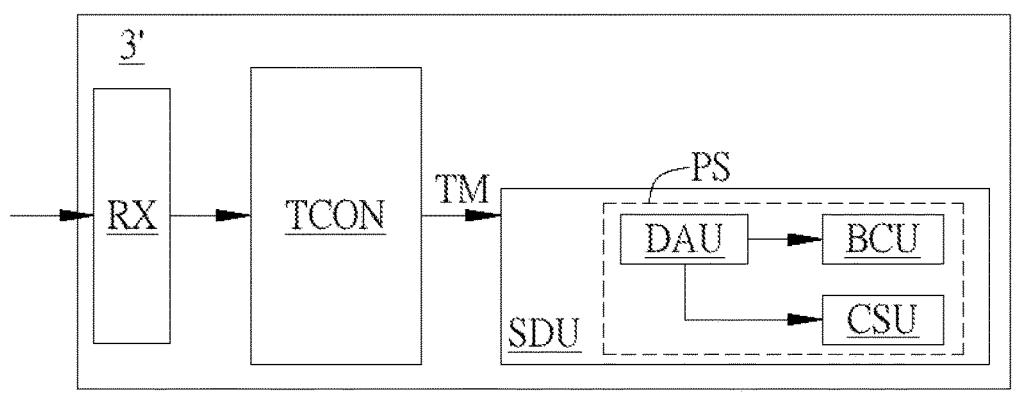
FIG. 3B is a schematic diagram of a power saving control apparatus applied to a source driver embedded with a timing controller according to another preferred embodiment of the invention.

Next, please refer to FIG. 3B. FIG. 3B is a schematic diagram of the power saving control apparatus applied to the timing controller (TCON) embedded source driver (TED).

As shown in FIG. 3B, the timing controller embedded source driver 3' includes a receiving unit RX, a timing control unit TCON, and a source driving unit SDU. The receiving unit RX is coupled to the timing control unit TCON. The timing control unit TCON is coupled to the source driving unit SDU and provides a timing control signal TM to the source driving unit SDU.

The power saving control apparatus PS is applied to the source driving unit SDU and the power saving control apparatus PS can include a data analyzing unit DAU, a bias control unit BCU and a charge sharing unit CSU. The data analysis unit DAU is coupled to the bias control unit BCU and the charge sharing unit CSU respectively.

In this embodiment, the bias control unit BCU is used for bias control; the charge sharing unit CSU is used for performing charge sharing; and the data analysis unit DAU is used for analyzing a display data in real time and generating an instant analysis result.

It should be noted that the use of the data analysis unit DAU to analyze the display data in real time can greatly reduce the amount of data storage, save the use of the line latch and achieve the effects of self-detection and immediate response.

After the data analysis unit DAU generates the instant analysis result, the data analysis unit DAU will also determine whether the bias voltage and the slew rate should be changed according to the instant analysis result. If the determination result is yes, the data analysis unit DAU will dynamically adjust the setting of bias voltage and slew rate of the bias control unit BCU, thereby effectively improving the power wastage caused by the bias control circuit with fixed bias voltage and slew rate in prior art.

In practical applications, a plurality of channels of the timing controller embedded source driver 3' can select the same setting of bias voltage and slew rate, or plurality of channels of the timing controller embedded source driver 3' can independently select different settings of bias voltage and slew rate to achieve optimal power saving effect.

In addition, after the data analysis unit DAU generates the instant analysis result, the data analysis unit DAU also determines whether the charge sharing range and the charge sharing group number should be changed according to the instant analysis result. If the determination result is yes, the data analysis unit DAU will dynamically adjust the charge sharing range and the charge sharing group number of the charge sharing units CSU to perform charge sharing to achieve the optimal power saving effect.

In practical applications, a plurality of channels of timing controller embedded source driver 3' can select the same equalizer for charge sharing, or plurality of channels of timing controller embedded source driver 3' can select different equalizers for charge sharing to achieve the optimal power saving effect.

Figure 4:
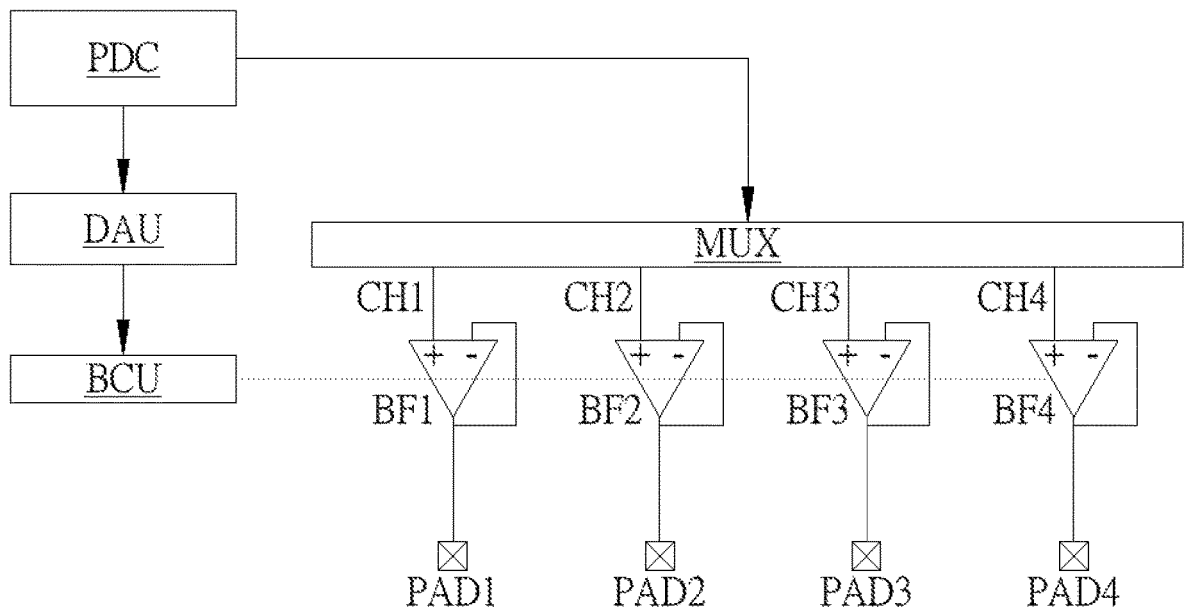
FIG. 4 is a schematic diagram showing the data analysis unit dynamically adjusting the setting of the bias voltage and slew rate of the bias control unit to make each channel to select the same setting.

Please refer to FIG. 4. As shown in FIG. 4, the data analysis unit DAU can dynamically adjust the setting of bias voltage and slew rate of the bias control unit BCU according to the instant analysis result, so that each channel CH1~CH4 can select the same setting, thereby saving hardware. The pixel data control unit PDC is coupled to the data analysis unit DAU and the multiplexer MUX respectively.

Figure 5:
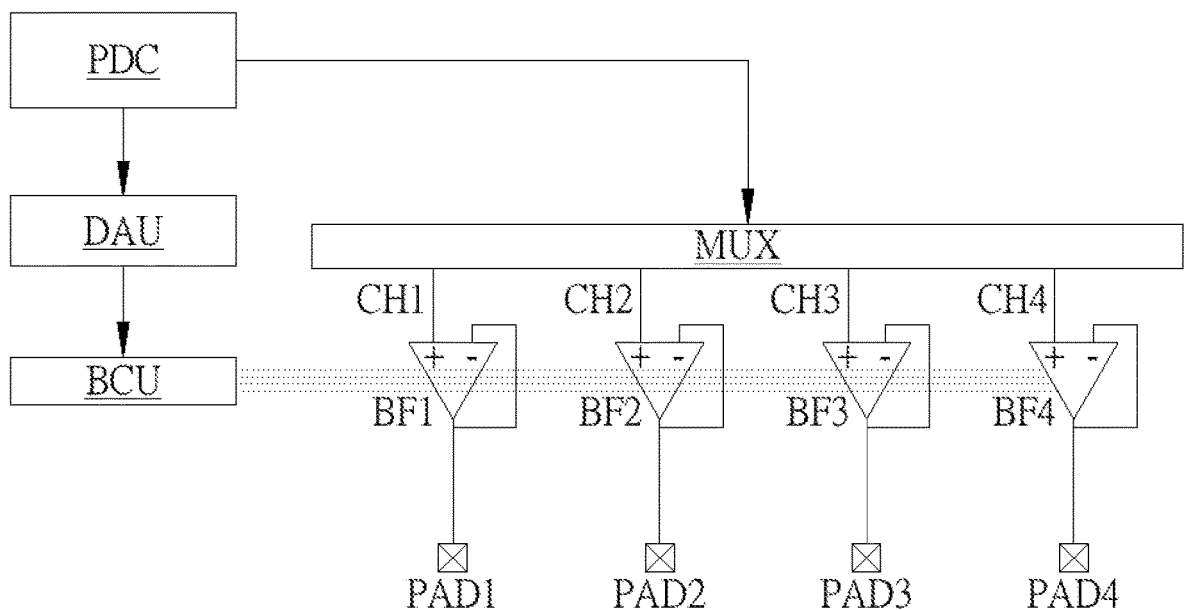
FIG. 5 is a diagram showing the data analysis unit dynamically adjusting the setting of the bias voltage and slew rate of the bias control unit to make each channel to arbitrarily select different settings.

Please refer to FIG. 5. As shown in FIG. 5, the data analysis unit DAU can dynamically adjust the setting of bias voltage and slew rate of the bias control unit BCU according to the instant analysis result, so that each channel CH1~CH4 can arbitrarily select different settings to achieve the optimal power saving effect, but the data transmission and hardware are relatively increased. The pixel data control unit PDC is coupled to the data analysis unit DAU and the multiplexer MUX respectively.

The data analysis unit DAU can dynamically adjust the charge sharing range and the charge sharing group number of the charge sharing unit CSU according to the instant analysis result, for example, selecting the required charge sharing range through the selection unit SEL and selecting the charge sharing group number through the charge sharing control unit, to achieve the optimal power saving effect.

Figure 6:
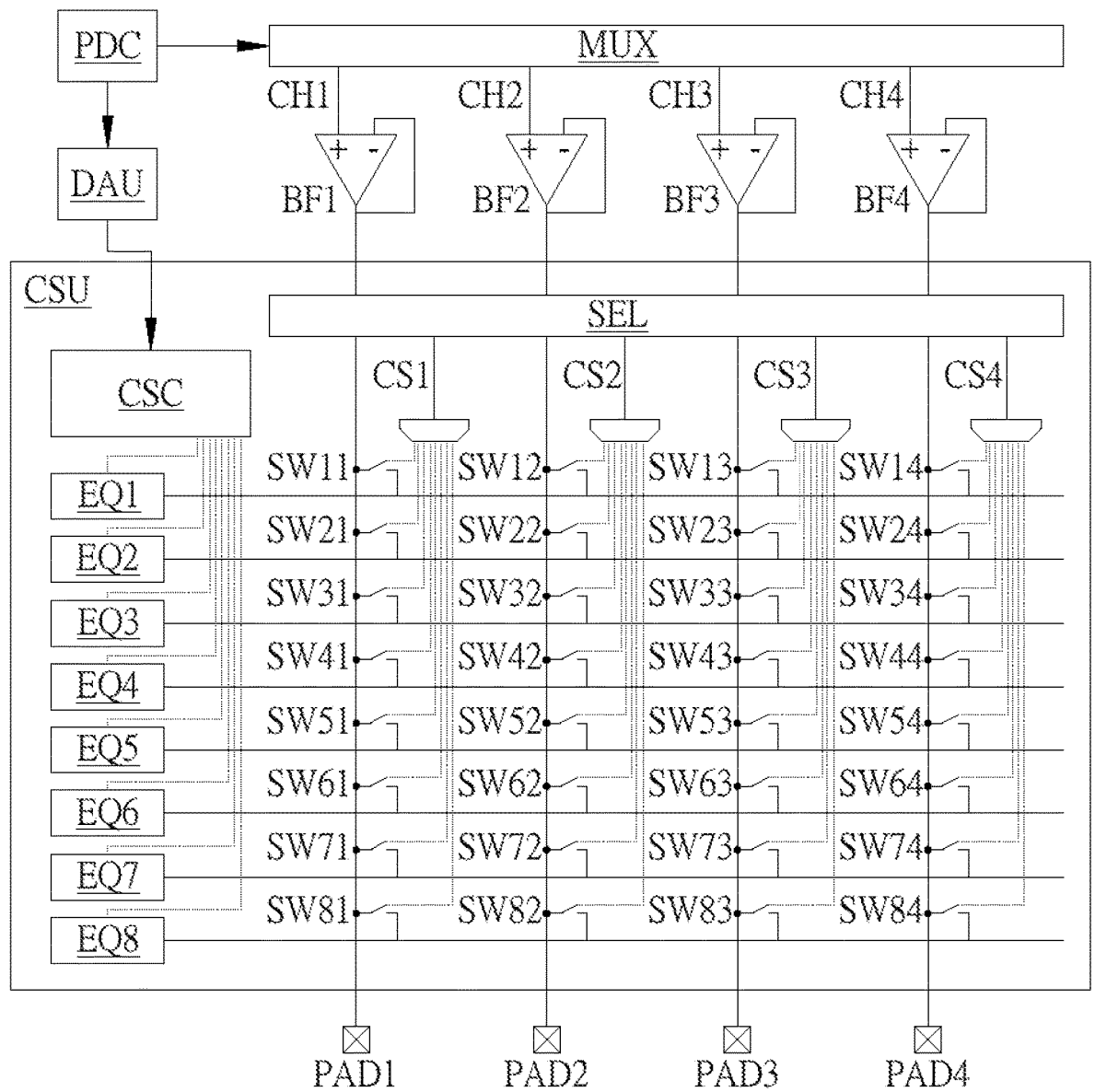
FIG. 6 is a schematic diagram showing the data analysis unit dynamically adjusting each channel to select the same equalizer for charge sharing.

As shown in FIG. 6, the data analysis unit DAU can dynamically adjust the charge sharing range and the charge sharing group number of the charge sharing unit CSU according to the instant analysis result, so that each channel CH1~CH4 can select the same equalizer (for example, the equalizer EQ1, the equalizer EQ2, the equalizer EQ3, the equalizer EQ4, the equalizer EQ5, the equalizer EQ6, the equalizer EQ7 or the equalizer EQ8) to perform charge sharing, thereby saving hardware. The pixel data control unit PDC is coupled to the data analysis unit DAU and the multiplexer MUX respectively.

Figure 7:
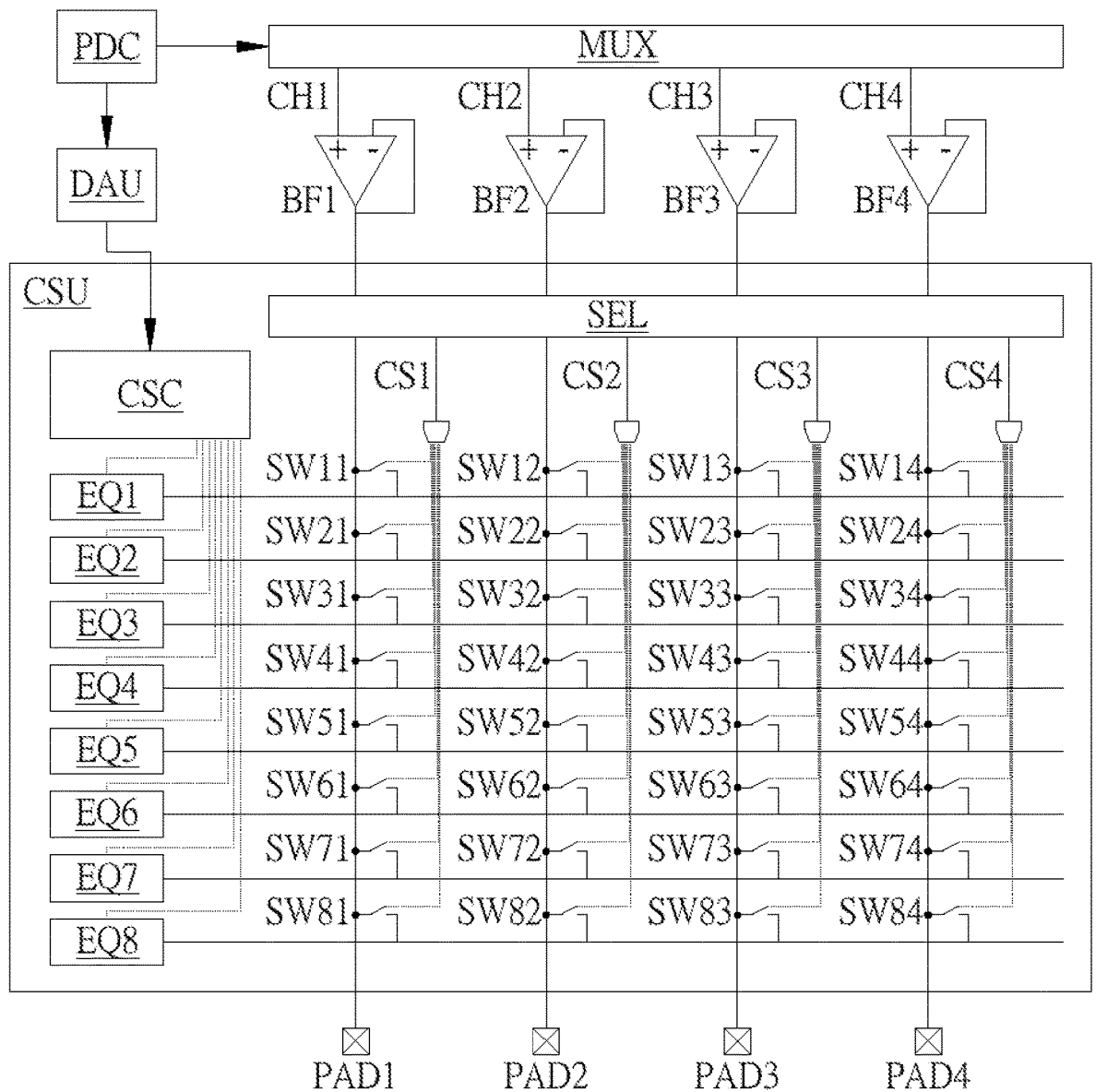
FIG. 7 is a schematic diagram showing the data analysis unit dynamically adjusting each channel to arbitrarily select different equalizers for charge sharing.

As shown in FIG. 7, the data analysis unit DAU can dynamically adjust the charge sharing range and the charge sharing group number of the charge sharing unit CSU according to the instant analysis result, so that each channel CH1~CH4 can arbitrarily select different equalizers (For example, the equalizers EQ1~EQ8) to perform charge sharing to increase the elasticity of charge sharing selection to achieve optimal power saving effect, but the data transmission and hardware are also relatively increased. The pixel data control unit PDC is coupled to the data analysis unit DAU and the multiplexer MUX respectively.

Figure 8:
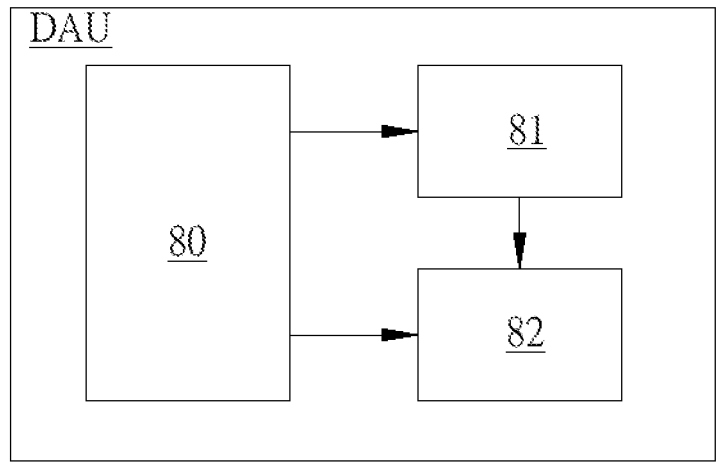
FIG. 8 is a schematic diagram showing a data analysis unit including a line data analyzer, a first calculator and a second calculator.

In practical applications, as shown in FIG. 8, the data analysis unit DAU of the invention can include a line data analyzer 80 for analyzing the display data on a line to obtain a characteristic value. Further, the data analysis unit DAU can further include a first calculator 81 and a second calculator 82. The first calculator 81 is coupled to the line data analyzer 80 for calculating the setting of bias voltage and slew rate required by the bias control unit BCU based on the characteristic value and the setting of charge sharing range and charge sharing group number required by the charge sharing unit CSU. The second calculator 82 is coupled to the line data analyzer 80 and the first calculator 81 for performing characteristic value operation between lines to obtain the instant analysis result.

Another embodiment of the invention is a power saving control method. In this embodiment, the power saving control method is applied to the power saving control apparatus of the display driving circuit.

Figure 9:
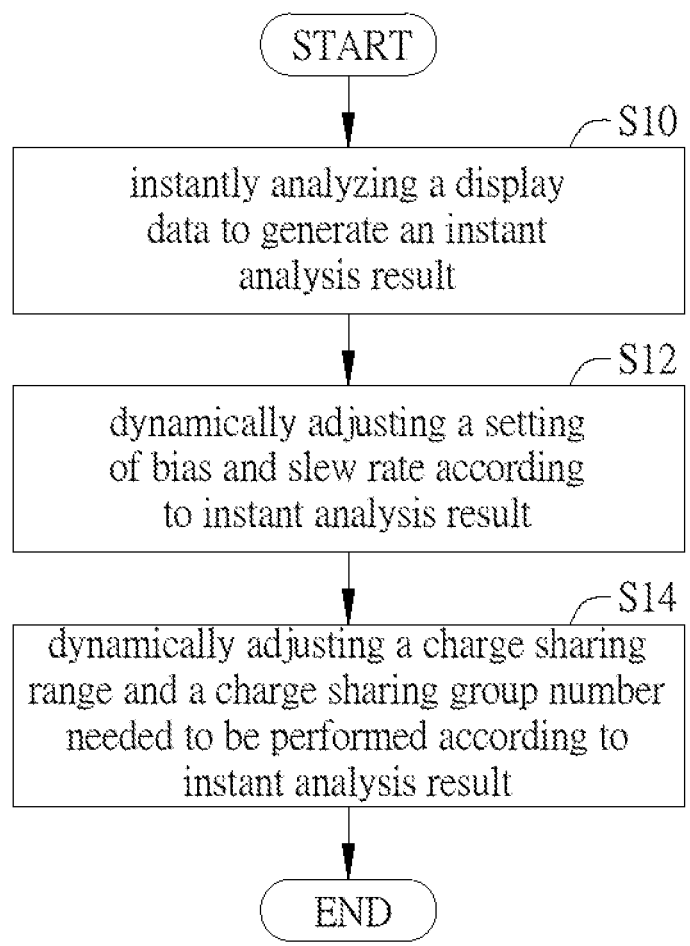
FIG. 9 is a flowchart showing the power saving control method in another preferred embodiment of the invention.

Please refer to FIG. 9. FIG. 9 is a flowchart showing the power saving control method of this embodiment. As shown in FIG. 9, the power saving control method can include the following steps:

Step S10: instantly analyzing a display data to generate an instant analysis result;

Step S12: dynamically adjusting a setting of bias and slew rate according to the instant analysis result; and Step S14: dynamically adjusting a charge sharing range and a charge sharing group number needed to be performed according to the instant analysis result.

It should be noticed that the flowchart shown in FIG. 9 is only one embodiment of the power saving control method of the invention. In other embodiments, the power saving control method of the invention can also perform Step S12 and Step S14 at the same time, or perform Step S12 after performing Step S14, without particular limitation and can be adjusted according to actual needs.

In practical applications, the instant data analyzing method used in the step S10 can include the following steps:
analyzing the display data on a line to obtain a characteristic value;
calculating a desired setting of bias voltage and slew rate and a desired setting of charge sharing range and charge sharing group number according to the characteristic value;

performing characteristic value operations between lines to obtain the instant analysis result.

Compared to the prior art, the power saving control apparatus and the power saving control method applied to the display driving circuit can achieve the following advantages and effects:

(1) since the data analysis unit can analyze the display data in real time, the amount of data storage can be greatly reduced and the use of the line latch can be saved to achieve the effects of self-detection and immediate response;

(2) according to the analysis result of the data analysis unit, not only the bias voltage and slew rate of the bias control unit can be dynamically adjusted, so that different channels can independently select different settings of bias voltage and slew rate, but also the charge sharing range and charge sharing group number needed to be performed by the charge sharing unit can be further dynamically adjusted to achieve the optimal power saving effect; and (3) since the timing controller is not used for display data comparison in the power saving control apparatus and the power saving control method of the invention, the power saving control apparatus and the power saving control method of the invention can be applied to the source driver and the timing controller (TCON) embedded source driver (TED).

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power saving control apparatus applied to a display driving circuit, the power saving control apparatus comprising:
    a bias control circuit, configured to perform bias control;
    a charge sharing circuit, configured to perform charge sharing; and
    a data analysis circuit, coupled to the bias control circuit and the charge sharing circuit respectively and configured to instantly analyze a display data to generate an instant analysis result;
    wherein the data analysis circuit dynamically adjusts a setting of bias and slew rate of the bias control circuit according to the instant analysis result, and the data analysis circuit dynamically adjusts a charge sharing range and a charge sharing group number needed to be performed by the charge sharing circuit according to the instant analysis result.

2. The power saving control apparatus of claim 1, wherein the display driving circuit is a source driver and coupled to a timing controller.

3. The power saving control apparatus of claim 1, wherein the display driving circuit is a source driver with an embedded timing controller.

4. The power saving control apparatus of claim 1, wherein a plurality of channels of the display driving circuit selects the same setting of bias and slew rate.

5. The power saving control apparatus of claim 1, wherein a plurality of channels of the display driving circuit selects different settings of bias and slew rate.

6. The power saving control apparatus of claim 1, wherein a plurality of channels of the display driving circuit selects the same equalizer to perform charge sharing.

7. The power saving control apparatus of claim 1, wherein a plurality of channels of the display driving circuit selects different equalizers to perform charge sharing.

8. The power saving control apparatus of claim 1, wherein the data analysis circuit comprises a line data analyzer for analyzing the display data on a line to obtain a characteristic value.

9. The power saving control apparatus of claim 8, wherein the data analysis circuit further comprises a first calculator coupled to the line data analyzer and used for calculating the setting of bias voltage and slew rate necessary for the bias control circuit according to the characteristic value.

10. The power saving control apparatus of claim 9, wherein the data analysis circuit further comprises a second calculator coupled to the data analyzer and the first calculator for performing characteristic value operations between lines to obtain the instant analysis result.

* * * * *